(12) United States Patent
Alkove et al.

(10) Patent No.: US 7,584,502 B2
(45) Date of Patent: Sep. 1, 2009

(54) POLICY ENGINE AND METHODS AND SYSTEMS FOR PROTECTING DATA

(75) Inventors: James M. Alkove, Woodinville, WA (US); Kirt A. Debique, Seattle, WA (US); Alexandre V. Grigorovitch, Redmond, WA (US); William C. Powell, Seattle, WA (US); Jeffrey Richard McKune, Sammanish, WA (US)

(73) Assignee: Microsoft Corporation, Redmond, WA (US)

( * ) Notice: Subject to any disclaimer, the term of this patent is extended or adjusted under 35 U.S.C. 154(b) by 887 days.

(21) Appl. No.: 10/838,532

(22) Filed: May 3, 2004

(65) Prior Publication Data

US 2005/0240985 A1 Oct. 27, 2005

(51) Int. Cl.
*H04L 9/12* (2006.01)
*H04L 9/18* (2006.01)

(52) U.S. Cl. .............................. 726/6; 726/30
(58) Field of Classification Search ............. 726/26–30, 726/1–8, 16–19; 713/155
See application file for complete search history.

(56) References Cited

U.S. PATENT DOCUMENTS

| 6,134,659 | A | 10/2000 | Sprong et al. |
|---|---|---|---|
| 6,226,618 | B1 | 5/2001 | Downs et al. |
| 6,449,598 | B1* | 9/2002 | Green et al. ................. 705/2 |
| 7,299,504 | B1* | 11/2007 | Tiller et al. ................. 726/30 |
| 2003/0004880 | A1* | 1/2003 | Banerjee et al. ............ 705/51 |
| 2004/0054629 | A1* | 3/2004 | de Jong et al. ............. 705/51 |
| 2004/0210695 | A1* | 10/2004 | Weber et al. .............. 710/240 |
| 2005/0066353 | A1* | 3/2005 | Fransdonk ................. 725/29 |

FOREIGN PATENT DOCUMENTS

EP 1128342 8/2001

OTHER PUBLICATIONS

PCT Search Report for PCT Application No. PCT/US2004/023606, mailed Aug. 15, 2008 (4 pages).

* cited by examiner

*Primary Examiner*—Kambiz Zand
*Assistant Examiner*—Venkat Perungavoor
(74) *Attorney, Agent, or Firm*—Lee & Hayes, PLLC (57) ABSTRACT

The described embodiments relate to data security. One exemplary system includes a first component associated with data on which an action can be performed and a second component configured to perform the action on the data. The system also includes a third component configured to ascertain the action and determine, as a function of the action, at least one policy to be implemented prior to allowing the second component to access the data.

33 Claims, 4 Drawing Sheets

POLICY ENGINE AND METHODS AND SYSTEMS FOR PROTECTING DATA

TECHNICAL FIELD

The present invention relates to architectures and methods for establishing a protected media path for delivering content in a trusted manner from any of a variety of sources to any of a variety of sinks.

BACKGROUND

As the availability, uses and value of digital data increases, there exists a need for improved methods and systems for protecting that data. A source which is a system for delivering or 'sourcing' the data can be associated with a source content protection system. Data from the source can be rendered for use by a sink which is a system for receiving or 'sinking' the data. The sink may be associated with a sink content protection system associated with the use of the data at the sink.

The source content protection system may impose one or more conditions, such as obtaining authorization for use of the data. Once the condition or conditions are met and access is obtained, the source content protection has limited ability to regulate further actions and associated content protection of the data. Even in situations where the source and the sink both have content protection systems, the degree of oversight and authority of the source upon the sink and/or intervening events within a processing environment is limited.

SUMMARY

Policy engines and methods and systems of protecting data are described herein. An upstream component associated with data can determine content policy associated with uses of the data by a downstream component. The upstream component can contribute the policy as a function of a specific action to be performed on the data by the downstream component. A further component, which can be embodied as a policy engine, can act on behalf of the upstream component to determine what content policies are supported by the downstream component, to negotiate implementation of a supported policy, and/or to enforce implementation of the supported policy before allowing the downstream component to access the data.

BRIEF DESCRIPTION OF THE DRAWINGS

The same numbers are used throughout the drawings to reference like features and components wherever feasible.

DETAILED DESCRIPTION

Overview

In the various embodiments described below, content protection is provided in the context of a media system that coordinates policy between a source and a sink and maintains trust along a media path. The system may comprise a component, such as a policy engine, which may act on behalf of the source in negotiating policy considerations with the sink. The policy engine may ascertain an action to be performed by a sink and allow the source to determine policy based on the action. The policy engine may then ensure that the selected policy is implemented by the sink before allowing the sink to access the source data. Alternatively or additionally the policy engine can act as a policy enforcer.

Exemplary Embodiments

Figure 1:
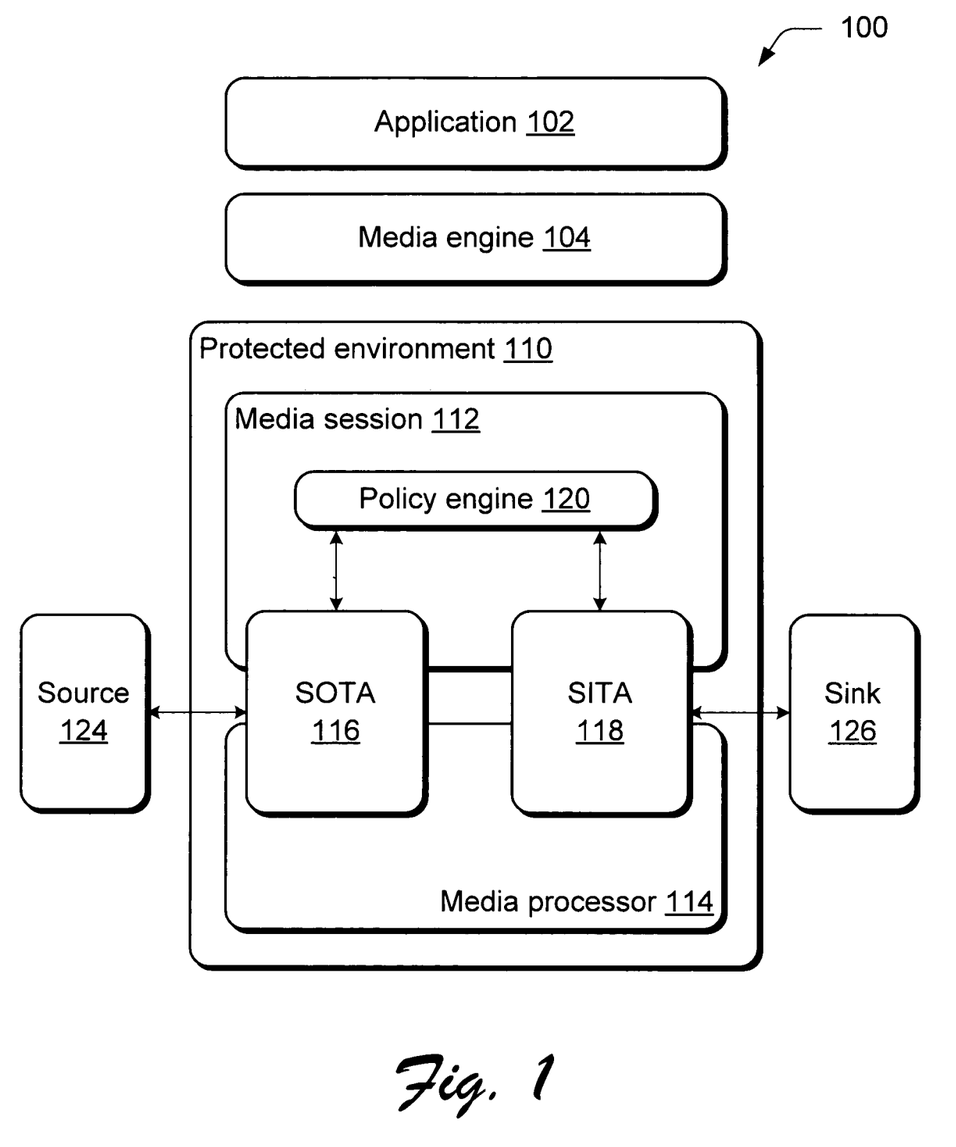
FIG. 1 illustrates a block diagram of a system in accordance with one embodiment.

FIG. 1 illustrates a high level block diagram of a system 100 in accordance one embodiment. In one or more embodiments, system 100 is implemented in software. In other embodiments, system 100 can be implemented in connection with any suitable software, firmware, hardware and/or a combination thereof.

In system 100, an application 102 interacts with a media engine 104. Operating within a protected media path or protected environment 110 are a media session 112, a media processor 114, a source trust authority 116, a sink trust authority 118, and a policy engine 120. Data can enter protected environment 110 from a source 124 and be supplied to a sink 126. Source 124 can be any type of system which contains, or has access to, source data. Sink 126 can be any system which can perform an action upon source data or a derivative thereof.

Once application 102 has selected a source and associated data and/or an associated action to be performed by the sink, the application is not involved in the rendering of the data by way of the protected environment 110, except perhaps to provide rendering control commands such as start, stop, repeat, reverse, fast forward, and the like.

Protected environment 110 allows for delivering data or content from the source 124 to the sink 126 while enabling the content to be processed accordingly in a protected manner. Source 124 may be associated with one or more source content protection systems for protecting the data associated with the source (i.e. the source data). For example, each stream of source 124 may be associated with any of several content protection systems, such as a digital rights management or rights management system, and/or may be associated with limited content protection, such as CGMS-A or Conditional Access System. The source may have different source content protections systems associated with various uses of the source data. Alternatively source 124 may not be associated with any content protection systems.

Similar to the source, sink 126 may be associated with one or more sink content protection systems. Further, the sink may support different sink content protection systems for different actions which it can perform. For example, the sink may be associated with a first set of content protection systems for a first action that it can perform based upon source data and a second set of content protection systems for a second action that is can perform based upon the data. In but one example, sink 126 may comprise both an audio system for receiving audio to be delivered to a speaker and a video system for receiving video be delivered to a display. Each of these functions may be associated with one or more content protection systems. In some instances sink 126 may not be associated with a sink content protection system. In such an instance policy engine 120 may allow the sink conditional access to the data, as will be discussed below. Further detail regarding an exemplary protected environment or protected media path is contained in Provisional Patent Application No.

60/513,831, filed on Oct. 23, 2003, titled Protected Media Path and Refusal Response Enabler, which is incorporated by reference herein.

Policy engine 120 can act on behalf of source 124 regarding the use of its data within protected environment 110. The policy engine can also require sink 126 to implement a sink content protection system to access the data of source 124. How the particular sink content protection system is selected is described in more detail below.

Policy engine 120 can reside within media session 112 and can be in communication with source trust authority (SOTA) 116 and sink trust authority (SITA) 118. SOTA 116 represents a corresponding source 124 in the protected environment 110. In the described embodiment, a source trust authority is a software agent of a source content protection system associated with source 124. Likewise, each sink trust authority SITA 118 is a software agent of a sink content protection system and represents a corresponding sink 124 in the protected environment 110.

The SOTA may function to provide decryption functionality for decrypting the data of source 124. Further, in some implementations, the SOTA may function to translate policy from a native format to a format amenable to the policy engine. Alternatively or additionally, the SOTA may also translate policy associated with the data into policy accepted by the policy engine 120 and/or SITA 118. As such the SOTA can translate source policy into specific output policy. Still further, in some implementations, the SOTA may provide exclusion information to the policy engine. For example, the SOTA may provide a component exclusion list or global revocation requirements to the to the policy engine.

SITA 118 may function to provide encryption functionality to encrypt data to be delivered to the sink 126 as appropriate. Thus, the sink 126 receives the data and corresponding policy, decrypts the received data if necessary, and renders the data based on the received policy. Note that the SITA 118 may likewise act for the sink 126, particularly with regard to questions relating to trust, policy, and rights.

Source policy typically is set forth in the aforementioned native format which is specific to a particular source, and can have any arbitrary complexity. For example, the policy can be expressed as a series of bits set on or off, can include logic set out in a pre-defined language to be executed, and/or can even include or refer to executable machine code. Generally, the policy may express information such as an action that can be taken with respect to the corresponding data, a condition precedent to the action that must exist, an event subsequent to the action that must be taken, elements that are to be present or that cannot be present with respect to the data, conditions on such elements, policy to be forwarded with delivered content, and the like.

In the illustrated and described embodiments, the policy engine 120 functions as the heart of the protected environment architecture and is responsible for enforcing policy on behalf of each SOTA 116. Thus, and as will be set forth in more detail below, the policy engine 120 negotiates policy between each applicable source 124 and each applicable sink 126, including required sink content protection systems, outbound policy on sink content protection systems, and media path component inclusion and exclusion. As mentioned above, policy engine 120 may act indirectly with the source and the sink via the SOTA 116 and SITA 118 respectively. In such an instance the policy engine engages the SOTA or SITA which engage their respective source or sink. The policy engine 120 also provides a protected environment within which data of source 124 can be processed with a level of assurance that the data is protected from theft by a nefarious entity.

Policy Engine

Figure 2:
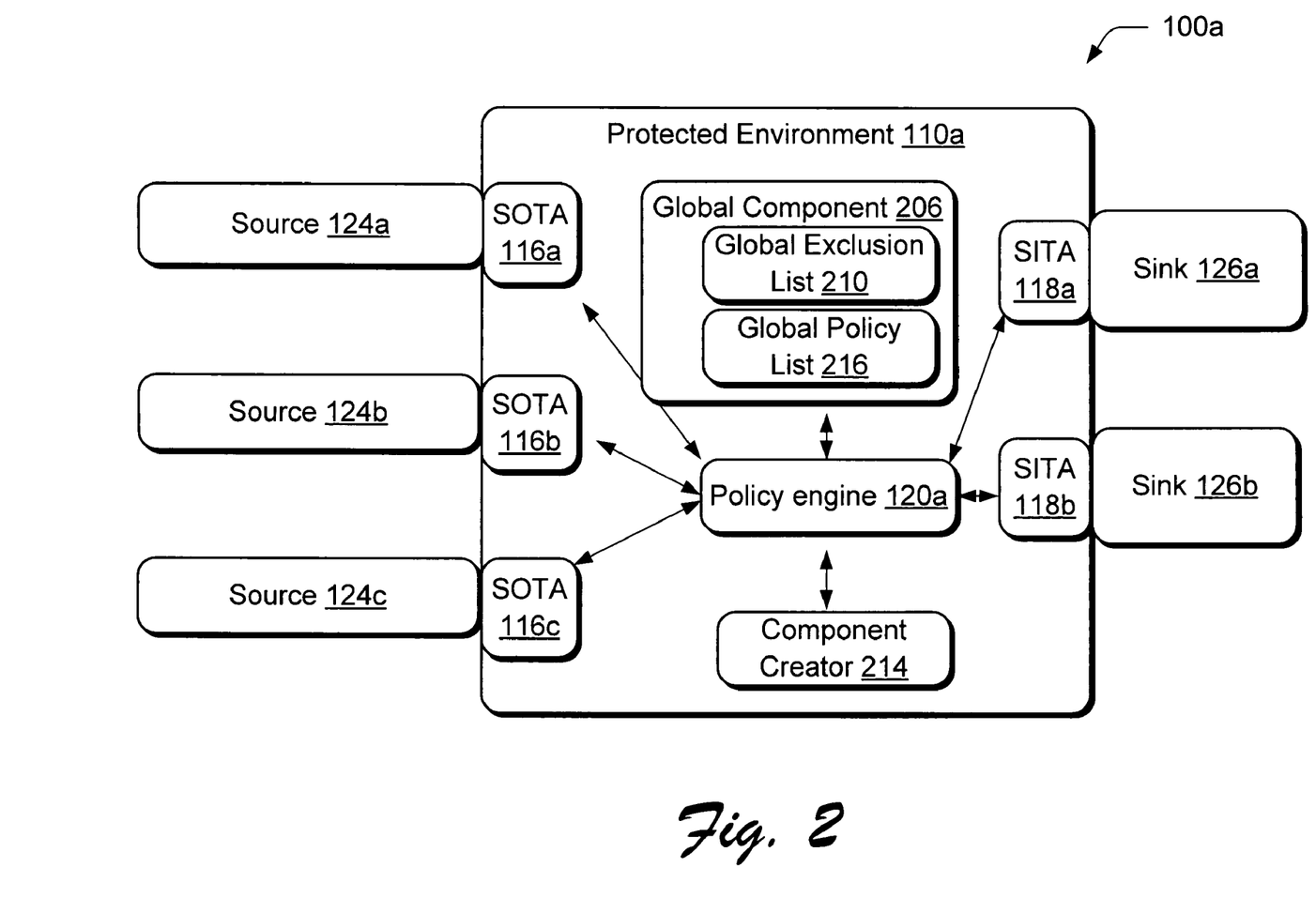
FIG. 2 is a block diagram of a system in accordance with another embodiment.

FIG. 2 illustrates a block diagram of another exemplary system 100a comprising multiple sources and multiple sinks. Policy engine 120a supervises transition of content from the source(s) 124a-124c to the protected environment 110a for processing and then out to the sink(s) 126a-126b. The policy engine's supervisory role can comprise various aspects that will be explained by means of example below.

In the examples that follow, the policy engine 120a learns of a proposed action or actions to be carried out by one or more of the sinks 126a-126b upon data associated with one of the sources 124a-124c. The policy engine can learn of a proposed action in various ways depending upon the system configuration. For example, some implementations may be configured such that the sinks' only access to the source data is controlled by the policy engine. In such a configuration the sink cannot access the data without policy engine approval.

Some of the steps described below may occur before the policy engine learns of the proposed action and/or some of the steps may occur subsequently to the policy engine learning of the proposed action, depending upon the implementation.

Access to the Source Data

As one aspect of its supervisory role, policy engine 120a can have exclusionary control of the components allowed in protected environment 110a and as such which components have access to the data of a particular source. Only those components that are deemed trusted by some root of trust are allowed to enter the process.

Some implementations establish trust utilizing a certification mechanism for dynamic link library(s) (DLL)s containing any components such as sinks or SITA that want to plug into the Protected Environment 110. The policy engine in conjunction with the Protected Environment 110 will allow components to be loaded only if they have this certificate. In various implementations, such certificates can be issued by the operating system, among other configurations. In some implementations, the certificate will be issued to a developer/company by an organization, which may be overseen by the operating system provider or some third-parties. The developer can then attach the certificate to all of their software. In some of these implementations, once a component's certificate is verified it is allowed to be loaded in the protected environment; and the policy engine trusts it to honor anything that it claims to support. If it is later discovered that a component violates this trust, either intentionally or unintentionally, then it will be added either to the global exclusion list or the source specific exclusion lists obtained from the SOTAs.

In but one implementation, when policy engine 120a initializes, it contacts all sources which are currently available, in this instance source(s) 124a-124c. The policy engine registers one or more SOTAs 116a-116c in relation to the individual sources.

Some exemplary implementations may comprise a mechanism for the SOTA to ensure that the component identifying itself as the policy engine is in fact the policy engine. One such implementation establishes trust between the SOTA and the policy engine with the following method. The policy engine calls SOTA object IMFSourceTrustAuthority::EstablishTrust and passes a pointer to the IMFTrustHost interface. The SOTA calls IMFTrustHost::GetCertificate to request a certificate from the policy engine. The certificate is signed with an operating system private key. The SOTA validates the certificate, generates a random number and then calls IMFTrustHost::SignChallenge. The policy engine signs the random number with the private key. The SOTA then verifies the signature using the public key from the certificate. This is but one implementation; the skilled artisan should recognize other configurations.

Upon registering the SOTA(s), the policy engine can receive information regarding any source content protection systems associated with the data of each source and/or other policy information relating to use of the data. The policy information may comprise an exclusion list from each SOTA. An exclusion list can relate to what components are or are not allowed to access the source data. For example, an exclusion list may exclude any component which does not have approved code from accessing the source data.

Policy engine 120a may receive various exclusionary policies from a given SOTA. For example, SOTA 118a may submit a list of components that are to be excluded from being loaded into the protected environment. The policy engine utilizes this policy information and/or may add additional exclusion conditions as is discussed in more detail below. For example, in some implementations the policy engine may require a certificate or other means of establishing trust before code is allowed into the protected environment. In such a configuration, the SOTA does not need to request such measures as the policy engine automatically implements them.

The policy engine 120a also may obtain a list of approved/excluded components from a different component that is not directly associated with any of the sources. In this illustrated and described implementation, the different component or global component 206 contains a global exclusion list 210. In but one implementation, the global exclusion list may be provided by the operating system, such as the Windows® brand operating system licensed by Microsoft® Corp. The global exclusion list can be a signed and time-stamped list downloaded from the operating system, among other configurations. The exclusion conditions from the SOTA and the global component may also impose conditions upon one another. For example, the SOTA's exclusion conditions may require that the global exclusion list must have been verified against the server within a given time period such as 30 days.

The policy engine 120a can combine or aggregate the exclusion lists obtained from the two components and formulate an exclusion list for use with the source data that excludes non-trusted components from the protected environment 110a. For example, the policy engine can aggregate lists from the global component and each of the SOTAs. The policy engine may load only trusted components such as those which have been deemed trusted by a DRM authority. In the event that the source does not have any source content protection system and/or does not have exclusionary policy associated with it, then the exclusion policy is based upon the global exclusion list 210.

Once policy engine 120a has gathered the available exclusion information it can enforce the exclusion information by excluding or allowing components access into the protected environment consistent with the exclusion information. In some implementations the policy engine performs this "gatekeeper" role of allowing and excluding components.

In some implementations, the exclusion information is passed from the policy engine to a third party component which conducts the actual enforcement functionality or gatekeeper role. In this instance the third party component can comprise component creator 214. The component creator handles the creation of all components inside this process and it will handle necessary verifications such as making sure that the only components allowed are the components that are trusted. In this instance, policy engine 120a receives policy information regarding SOTAs 118a associated with source 124a. The policy engine also receives policy information from global component 206 in the form of a global exclusion list 210. The policy engine forwards the exclusion information from the various sources to component creator 214 which can handle the exclusion functionality described in more detail below.

In some implementations, the exclusion information goes directly from the SOTA to the third party component which conducts the actual enforcement functionality. For example, policy engine 120a can request the exclusion information from the various SOTAs. The SOTAs then deliver the information directly to the component creator 214.

In an alternative implementation, policy engine 120a controls entrance to the protected environment 110a and as such controls access to the data. In one such instance, the policy engine learns of an action to be performed on data from a given source and then allows only the involved components to enter the protected environment to access the data. For example, source 124a is configured to access data from a digital versatile disk (DVD) and the policy engine learns that a user wants to play that data. In this instance, sink 126a comprises a system which can generate a visual image on a screen and which can generate an audible sound on a speaker from the source data. The policy engine can then ascertain exclusion information from SOTA 116a and/or the global exclusion list 210 to determine if sink 126a will be allowed to access the data in the protected environment 110a. The policy engine 120a then can proceed with the rest of its functionalities with only these involved components. The policy engine could be implementing and managing many such action specific protected environments simultaneously. The policy engine then discontinues individual protected environments upon completion of a particular action. In the example above, the policy engine is described in relation to its role with the source and sinks, the policy engine may also be overseeing other components, such as transforms, that may access the data.

The examples above are based upon actions which are allowed by the source and/or third party exclusion and/or policy lists. Other actions may not be allowed at all and so the policy engine 120a does not gather associated exclusion information. For example, returning again to FIG. 2, SITA 118b may request to copy the data from source 124c. If SOTA 116c does not allow that action the policy engine 120a and/or the component creator 214 can act to block access to the data without progressing through other steps. Still other actions may be conditionally excluded. For example, an action may be barred or excluded until the user acquires a license to use the data in the desired manner. As such, the sink may be prevented from entering the protected environment pending acquisition of a license. Other examples are discussed in the paragraphs below.

Registering Content Policy Associated with the Source Data

Policy engine 120a can gather content protection policy associated with an action to be performed on data associated with a particular source. Examples of such actions can include, but is not limited to play, copy, export, backup. At least some of this content policy can relate to what types of sink or output content protection policies the source wants utilized for a given action utilizing the source data. In but one configuration, the policy engine learns of an action to be performed on source data by a given sink. For example, policy engine 120a might receive a request for sink 126a to generate a visual image on a screen and an audible sound on a speaker from the source data associated with source 124a. The policy engine can enquire with SOTA 116a to ascertain what sink protection policy the source requires for these actions. The policy engine may receive zero, one, or multiple protection policies from the source. For example, in the case of unprotected content the policy engine may not obtain any policies directly associated with the data. In other instances the SOTA may provide multiple policies. In this example, the SOTA may provide a first set of policies associated with utilizing the data to create a visual image. For example, source policies might require the sink to support High-bandwidth Digital Content Protection (HDCP) or Macrovision protocol. Similarly, the SOTA may provide a second set of policies associated with utilizing the data to create sound. For example, such policies might include Digital Transmission Control Protocol (DCTP).

In other instances the SOTA policies may relate to various parameters associated with an action. For example a policy may only allow copying of source content if some condition is met. In this example, if the action is to make a copy, the SOTA may have a policy that such action can occur only if the copy expires after 30 days. In one implementation the SOTA may include such conditions in the Sink Content Protection policy which the Policy Engine communicates to the SITA. In another implementation the SOTA may translate such conditions to a generic language understood by the Policy Engine, which in turn can communicate that information to the SITA. In both cases SITA is responsible for honoring those conditions.

In another example, in some configurations the source policies may allow an action to proceed where the sink does not support any protection system whatsoever. For example, a sink may request to create a visual display but may not support any associated sink content protections systems. The source, via the policy engine, may allow the action to proceed if some condition is met. For example, the source may want the visual signal to be of diminished quality to downgrade output resolution relative to the potential of the source data. The policy engine can decide whether to natively enforce that condition or delegate it to another component, but whichever option is selected, it is the role of the policy engine to make sure that it gets done. So the policy engine may downgrade the resolution or it may recognize that the sink can do it internally and order the sink to do so. Again, the policy engine can act on behalf of the source to ensure compliance as will be described in more detail below.

In some implementations, in addition to querying the media source, the policy engine also queries at least one component not directly associated with the source data (e.g. a third party component) for policy relating to the proposed actions. In the illustrated implementation, the third party component is global component 206 which controls the global policy list 216.

The policy engine can then aggregate the policy lists from the two policy sources into a single list or array. If more than one action is to be performed by a sink, the policy engine can aggregate policy lists for the various actions. For example, if the action is to 'play data' the policy engine may compile an aggregated array relating to creating a visual image and a separate list relating to creating sound. Each list or array can be ranked by the policy engine based on some criteria. In the illustrated and described implementation the policy engine ranks the aggregated list by order of preference. The policy engine may get the order of preference from the SOTA or determine the order of preference internally. In this particular instance the order of preference is based upon security, i.e. the policy engine ranks the policies from most secure to least secure.

Alternatively, the policy engine may first enquire with the SITA as to what sink or output protection policy it supports for the sink's proposed action. The policy engine can then provide the SITA's output protection information to the SOTA of the appropriate source and/or the global policy component for selection of one of the supported policies.

In another configuration, upon initialization, the policy engine queries all sources and all sinks. From each source the policy engine receives policy information relating to its source data. For each action which can be performed on the source data, the source can provide a list of one or more policies that it requires. If the source allows various policies for a given action, those policies may be provided in a ranked order of preference. The policy engine receives information from each sink regarding the actions which the sink can perform and the associated output protection policies the sink supports for that action. As such, the policy engine creates a master list of actions which can be performed on data contained in the various sources and the policies associated with allowing individual actions. In such a configuration, the policy engine has already accumulated information from the source and or the sink when it learns of an action to be performed by a sink.

Negotiating on Behalf of the Source

Once policy engine 120a has the content policy lists, the policy engine acts on behalf of the SOTA 116a-116c to negotiate the list with the SITA 118a-118b. The policy engine can query the SITA to find out what content policies from the list that the SITA supports. In some implementations where the list is ranked from most secure to least secure the policy engine may enquire with the SITA if it supports the various policies in order from most secure to least secure.

The policy engine 120a may instruct the SITA 118a-118b to implement the highest ranking (most secure) policy that it supports. In other implementations the policy engine may find out what policies the SITA supports and then go back to the SOTA and/or the third party policy component and let the SOTA and/or third party policy component pick one of the supported policies. For example, the policy engine can enquire with the SITA regarding supported policy and the SITA might respond that it supports "a, b, and c". The policy engine can then go back to the SOTA and query which one of "a,b,c" is to be implemented. So in this example the SOTA effectively gets to pick what policy to use from the list of output protection systems supported by the sink.

The policy engine may engage in parallel negotiations on behalf of a given source. For example, policy engine 120a may be simultaneously negotiating policy for video output and audible output from data associated with source 124a. Alternatively or additionally, the policy engine may be negotiating on behalf of two SOTAs 116a-116b in regard to a single sink. For example, a first source 124a may be configured to supply data from a DVD comprising a movie. The first source may want Windows media DRM to be implemented before allowing the sink(s) to access the data to generate a visual image and a different policy for generating audio. Simultaneously, second source 124b may be configured to supply cable television content that sink 126a can utilize to generate a picture in picture display. The second source 124b providing the cable data may want cable conditional access to be implemented before allowing access to its data. The policy engine can negotiate on behalf of each of the two sources 124a, 124b and make sure that all three policies are implemented by the sink 126a.

Once a policy choice is made for a sink or its associated SITA, the policy engine can affect configuration information on the SITA. For example, if the system has payload and configuration data associated with it, the policy engine can set that on the SITA.

Enforcement of the Selected Policy

The policy engine 120a can perform various enforcement functionalities on behalf of the SOTA 116a-116c. Such enforcement functionality can include ensuring that the sink is properly authorized, such as with a DRM certificate. In some implementations, the policy engine may pass other policies/conditions coming from the SOTA to the SITA. The policy engine may act similarly regarding other components, such as transforms, loaded in the protected environment.

In other implementations the policy engine may have additional enforcement capabilities. In some implementations, where a proposed action is prohibited by the SOTA, the enforcement functionality can ensure that the sink 126a-126b does not access the data. In some of these implementations, where a policy which is supported by the sink has been selected and the SITA has been instructed to implement the supported policy, the policy engine can ensure that the policy has in fact been implemented before allowing the sink to access the data. The policy engine may subsequently recheck to ensure that the policy is still implemented while the sink has access to the data.

Exemplary Method

Figure 3:
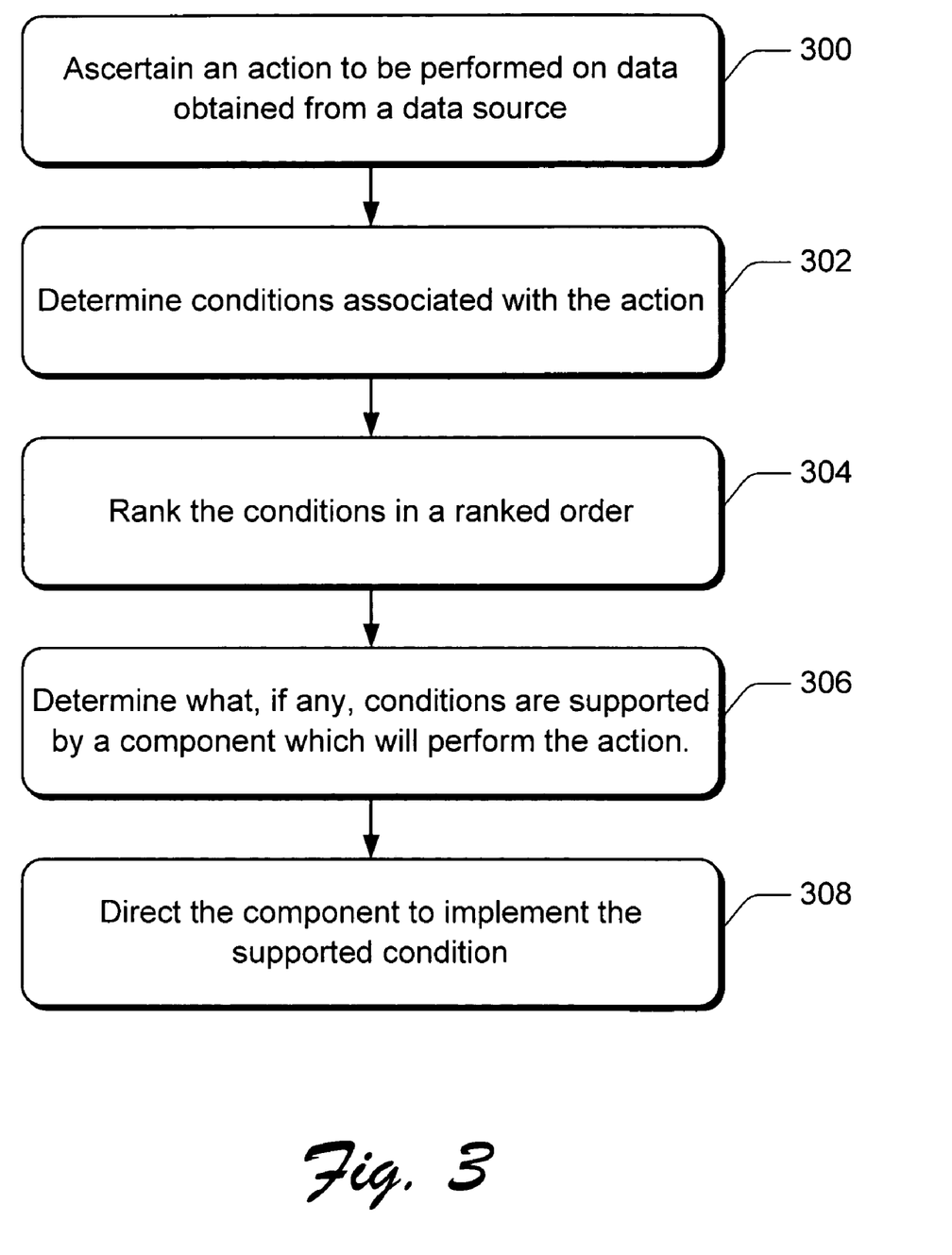
FIG. 3 is a flow diagram that describes steps in a method in accordance with one embodiment.

FIG. 3 illustrates steps in an exemplary method in accordance with one embodiment. The method can be implemented in connection with any suitable hardware, software, firmware or combination thereof. In one embodiment, the method can be implemented using an exemplary software architecture such as that described above, in connection with a computer system such as that described below in relation to FIG. 4. It is to be appreciated and understood, however, that other software architectures and computer systems can be utilized without departing from the spirit and scope of the claimed subject matter. In addition, it is to be appreciated that some of the acts described in this figure need not occur in the order in which they appear in the flow diagram.

Step 300 ascertains an action to be performed on data obtained from a data source. In the examples described above, an action can comprise numerous different functionalities including, but not limited to, recording, playing, creating a visual image, and creating sound. In some implementations the method can ascertain the action from a component which will perform the action. Such a component may comprise a data sink or a SITA associated with the data sink. In some implementations, the method can ascertain the action from a user input requesting the action be performed or from other means.

Step 302 determines one or more conditions associated with the action. The conditions can relate to output protection systems that are to be employed to protect the data. In but one implementation the method can retrieve the conditions associated with the action from the source or a SOTA associated with the source and/or from at least one other component not directly associated with the source. In one implementation the component not directly related to the source can comprise a global policy list.

Step 304 ranks the conditions in a ranked order. In one implementation, the conditions are ranked from most secure to least secure. Some other implementations may aggregate conditions from the source and at least one other component, and then rank the aggregated list.

Step 306 determines what, if any, conditions are supported by a component which will perform the action. The conditions may comprise sink content protection systems, among others. Some implementations then go back to the data source to allow the data source to select one of the supported conditions. Other implementations may query the component whether it supports the conditions from the list. Some implementations query the component starting with the highest ranking condition and proceed down the list until a supported condition is identified. If the component does not support any of the listed conditions the component may be precluded from accessing the data.

Step 308 directs the component to implement the supported condition. In some implementations a further enforcement check can be made to verify that the component has in fact implemented the supported condition before allowing the component to access the data. If the component performing the action does not support any of the conditions, access to the data may be blocked. Alternatively or additionally, additional conditions may be imposed on the use of the data for the action. Such additional conditions may include diminishing at least one property of the data. For example, the source may require that the definition of a video signal be diminished from high definition to standard definition.

Exemplary Computer Architecture

Figure 4:
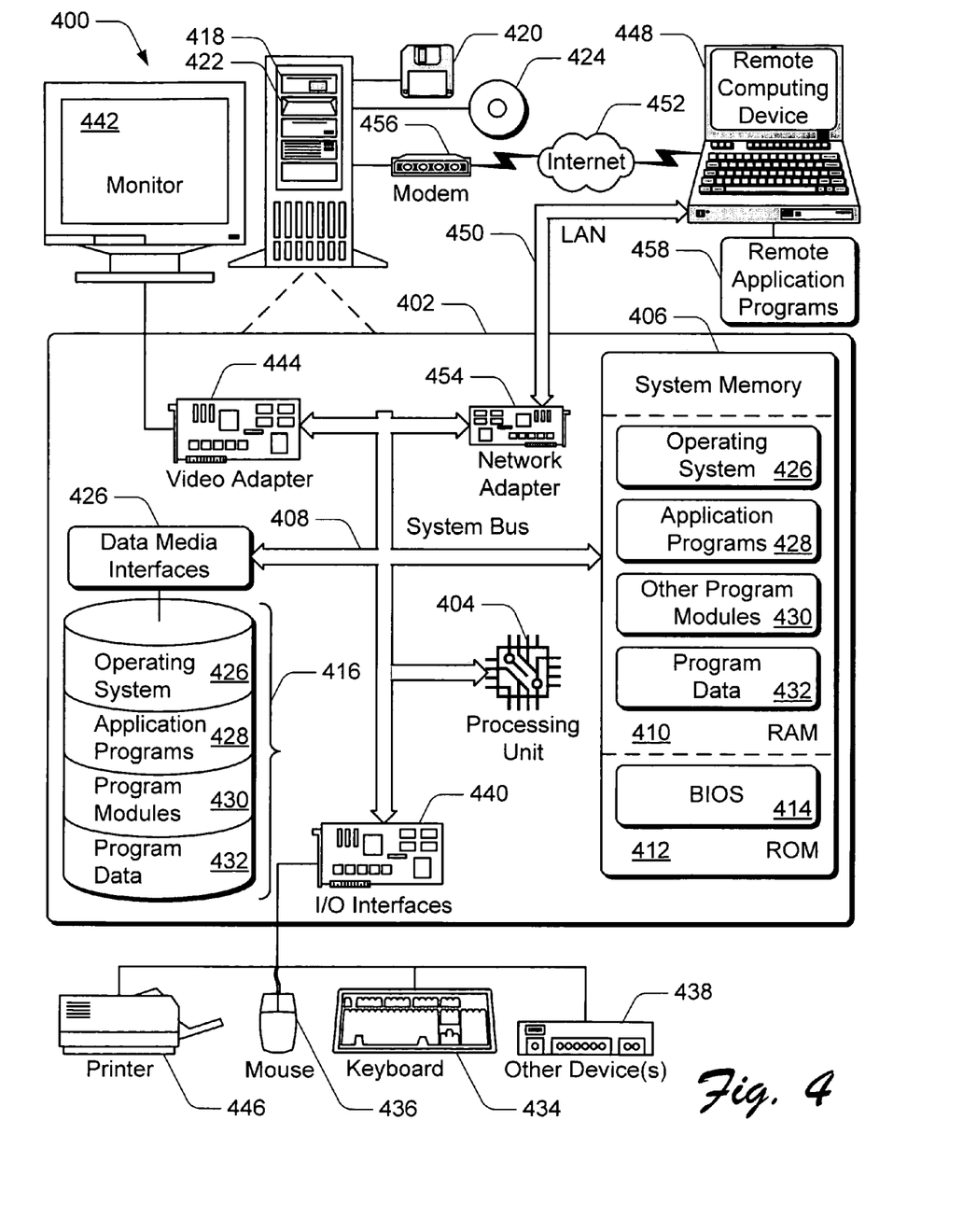
FIG. 4 illustrates exemplary computing systems, devices, and components in an environment in which data protection can be implemented.

FIG. 4 illustrates an exemplary computing environment 400 within which content protection systems, as well as the computing, network, and system architectures described herein, can be either fully or partially implemented. Exemplary computing environment 400 is only one example of a computing system and is not intended to suggest any limitation as to the scope of use or functionality of the architectures. Neither should the computing environment 400 be interpreted as having any dependency or requirement relating to any one or combination of components illustrated in the exemplary computing environment 400.

The computer and network architectures in computing environment 400 can be implemented with numerous other general purpose or special purpose computing system environments or configurations. Examples of well known computing systems, environments, and/or configurations that may be suitable for use include, but are not limited to, personal computers, server computers, client devices, hand-held or laptop devices, microprocessor-based systems, multiprocessor systems, set top boxes, programmable consumer electronics, network PCs, minicomputers, mainframe computers, gaming consoles, distributed computing environments that include any of the above systems or devices, and the like.

The computing environment 400 includes a general-purpose computing system in the form of a computing device 402. The components of computing device 402 can include, but are not limited to, one or more processors 404 (e.g., any of microprocessors, controllers, and the like), a system memory 406, and a system bus 408 that couples the various system components. The one or more processors 404 process various computer executable instructions to control the operation of computing device 402 and to communicate with other electronic and computing devices. The system bus 408 represents any number of several types of bus structures, including a memory bus or memory controller, a peripheral bus, an accelerated graphics port, and a processor or local bus using any of a variety of bus architectures.

Computing environment 400 includes a variety of computer readable media which can be any media that is accessible by computing device 402 and includes both volatile and non-volatile media, removable and non-removable media. The system memory 406 includes computer-readable media in the form of volatile memory, such as random access memory (RAM) 410, and/or non-volatile memory, such as read only memory (ROM) 412. A basic input/output system (BIOS) 414 maintains the basic routines that facilitate information transfer between components within computing device 402, such as during start-up, and is stored in ROM 412. RAM 410 typically contains data and/or program modules that are immediately accessible to and/or presently operated on by one or more of the processors 404.

Computing device 402 may include other removable/non-removable, volatile/non-volatile computer storage media. By way of example, a hard disk drive 416 reads from and writes to a non-removable, non-volatile magnetic media (not shown), a magnetic disk drive 418 reads from and writes to a removable, non-volatile magnetic disk 420 (e.g., a "floppy disk"), and an optical disk drive 422 reads from and/or writes to a removable, non-volatile optical disk 424 such as a CD-ROM, digital versatile disk (DVD), or any other type of optical media. In this example, the hard disk drive 416, magnetic disk drive 418, and optical disk drive 422 are each connected to the system bus 408 by one or more data media interfaces 426. The disk drives and associated computer readable media provide non-volatile storage of computer readable instructions, data structures, program modules, and other data for computing device 402.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, application programs 428, other program modules 430, and program data 432 (or some combination thereof) may include an embodiment of the systems and methods described herein.

Computing device 402 can include a variety of computer readable media identified as communication media. Communication media typically embodies computer readable instructions, data structures, program modules, and includes any information delivery media. By way of example, and not limitation, communication media includes wired media such as a wired network or direct-wired connection, and wireless media and any combination thereof.

A user can interface with computing device 402 via any number of different input devices such as a keyboard 434 and pointing device 436 (e.g., a "mouse"). Other input devices 438 (not shown specifically) may include a microphone, joystick, game pad, controller, satellite dish, serial port, scanner, and/or the like. These and other input devices are connected to the processors 404 via input/output interfaces 440 that are coupled to the system bus 408, but may be connected by other interface and bus structures, such as a parallel port, game port, and/or a universal serial bus (USB).

A monitor 442 or other type of display device can be connected to the system bus 408 via an interface, such as a video adapter 444. In addition to the monitor 442, other output peripheral devices can include components such as speakers (not shown) and a printer 446 which can be connected to computing device 402 via the input/output interfaces 440.

Computing device 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computing device 402.

Logical connections between computing device 402 and the remote computing device 448 are depicted as a local area network (LAN) 450 and a general wide area network (WAN) 452. Such networking environments are commonplace in offices, enterprise-wide computer networks, intranets, and the Internet. When implemented in a LAN networking environment, the computing device 402 is connected to a local network 450 via a network interface or adapter 454. When implemented in a WAN networking environment, the computing device 402 typically includes a modem 456 or other means for establishing communications over the wide area network 452. The modem 456, which can be internal or external to computing device 402, can be connected to the system bus 408 via the input/output interfaces 440 or other appropriate mechanisms. The illustrated network connections are exemplary and other means of establishing communication link(s) between the computing devices 402 and 448 can be utilized.

In a networked environment, such as that illustrated with computing environment 400, program modules depicted relative to the computing device 402, or portions thereof, may be stored in a remote memory storage device. By way of example, remote application programs 458 are maintained with a memory device of remote computing device 448. For purposes of illustration, application programs and other executable program components, such as the operating system 426, are illustrated herein as discrete blocks, although it is recognized that such programs and components reside at various times in different storage components of the computing device 402, and are executed by the processors 404 of the computing device.

CONCLUSION

The various embodiments described above can provide data security in which an upstream component associated with data can be allowed to determine content policy associated with use of the data by a downstream component. The upstream component can contribute the policy as a function of a specific action to be performed on the data by the downstream component. A further component, which can be embodied as a policy engine, can act on behalf of the upstream component to determine what content policies are supported by the downstream component, to negotiate implementation of a supported policy, and to enforce implementation of the supported policy before allowing the downstream component to access the data.

Although the inventive concepts have been described in language specific to structural features and/or methodological steps, it is to be understood that the inventive concepts in the appended claims are not limited to the specific features or steps described. Rather, the specific features and steps are disclosed as forms of implementing the inventive concepts.

The invention claimed is:

1. A method comprising:
   ascertaining an action to be performed on data obtained from a data source, wherein ascertaining is from a sink trust authority associated with a data sink;
   retrieving content policies associated with the action, wherein retrieving content policies is from a source trust authority and at least one other component;
   ranking the policies in a ranked order, wherein the ranking comprises creating an array which ranks the policies from highest priority to lowest priority;
   inquiring whether individual policies are supported by the data sink; and, directing the data sink to implement one of the ranked policies supported by the data sink along a trusted media path, wherein the trusted media path comprises the sink trust authority, the source trust authority and the at least one other component, wherein the at least one other component is a policy component negotiating one or more policies between the source trust authority and the sink trust authority.

2. The method of claim 1 further comprising enforcing an individual policy.

3. The method of claim 1 further comprising verifying that the data sink has implemented the one policy, and then allowing the data sink to access the data to perform the action.

4. The method of claim 1, wherein said act of retrieving content policies from at least one other component comprises retrieving content policies from a global policy list.

5. The method of claim 1, wherein said act of ranking is based, at least in part, on security criteria.

6. The method of claim 1, wherein the act of inquiring comprises inquiring with the sink trust authority.

7. The method of claim 1 further comprising after said act of inquiring, blocking said action if the data sink does not support at least one of the policies.

8. The method of claim 1 further comprising after said act of inquiring, imposing an additional condition on the data for the action if the data sink does not support at least one of the policies.

9. The method of claim 8, wherein said act of imposing comprises diminishing at least one property of the data.

10. The method of claim 1, wherein the act of directing comprises directing the sink trust authority to cause the data sink to implement one of the ranked policies.

11. The method of claim 1 further comprising after said act of directing, blocking said action if none of the ranked policies is implemented by the sink.

12. The method of claim 11, wherein said act of blocking comprises preventing the data from reaching the sink.

13. One or more computer-readable storage media having computer-readable instructions which, when executed, implement the method of claim 1.

14. A software system embodiment on a computer-readable storage media, the software system comprising a policy engine configured to implement the method of claim 1.

15. A method comprising:
ascertaining at least one action to be performed with data associated with a first component;
determining conditions associated with the action, wherein the determining comprises acquiring the conditions from the first component and a third component and creating an array which ranks the conditions; and,
confirming that a second component which will perform the action is configured to support at least one of the conditions, wherein the first component and the second component maintain trust along a media path, wherein the media path comprises at least the first component, the second component, and the third component, the sink trust authority, the source trust authority and the at least one other component, wherein the third component is a policy component negotiating one or more policies between the first component and the second component.

16. The method of claim 15 further comprising ensuring that the second component implements at least one of the conditions prior to accessing the data.

17. The method of claim 16, wherein at least one of said acts of ascertaining, determining, confirming, and ensuring is not performed by either of the first and second components.

18. The method of claim 15 further comprising establishing trust of the second component before allowing the second component into a protected environment to access the data associated with the first component.

19. One or more computer-readable storage media having computer-readable instructions which, when executed, implement the method of claim 15.

20. A software system embodiment on a computer-readable storage media, the software system comprising a policy engine configured to implement the method of claim 15.

21. A method comprising:
establishing trust with a downstream component based at least in part on policy obtained from an upstream component;
ascertaining an action to be performed by the downstream component on data derived from the upstream component;
receiving conditions, from the upstream component and a universal component, associated with allowing the downstream component to access the data, wherein the receiving comprises aggregating the conditions from the upstream component and the conditions from the universal component into a ranked array; and
establishing trust between the upstream component and a policy component by calling the upstream component and passing a pointer to an IMFTrustHost interface to request a certificate.

22. The method of claim 21, wherein acts of the establishing trust with the downstream component, ascertaining and receiving are conducted by the policy component.

23. The method of claim 21 further comprising inquiring whether the downstream component supports any of the conditions.

24. The method of claim 23 further comprising directing the downstream component to implement a supported condition before authorizing the downstream component to access the data.

25. The method of claim 24 further comprising after said act of directing and before authorizing, verifying that the downstream component implemented the supported condition.

26. One or more computer-readable storage media having computer-readable instructions which, when executed, implement the method of claim 21.

27. A software system embodiment on a computer-readable storage media, the software system comprising a policy engine configured to implement the method of claim 21.

28. A system embodied on a computer-readable storage medium, the system comprising:
a memory;
a processor coupled to the memory;
a first component operable by the processor associated with data on which an action can be performed;
a second component configured to perform the action on the data; and,
a third component configured to ascertain the action and determine, as a function of the action, at least one policy to be implemented prior to allowing the second component to access the data, wherein the third component is configured to negotiate, on behalf of the first component, implementation of the at least one policy with the second component; and
wherein the third component is configured to:
establish trust before allowing the second component into a protected environment where processing of data can occur thereby maintaining trust along a media path;

form an aggregated exclusion list from a first exclusion list obtained from the first component and a second exclusion list obtained from a fourth global component that is not directly associated with the first component and is not directly associated with the second component; and, load a list of components to be allowed into the protected environment utilizing at least the aggregated exclusion list.

29. The system of claim 28, wherein the third component is configured to deny the second component access to the data until the second component implements the at least one policy.

30. The system of claim 28, wherein the third component is configured to:

determine the action to be performed by the second component with the data;

ascertain conditions associated with the use of the data from the first component wherein said conditions are in a ranked order;

determine if any of the conditions are supported by the second component; and, instruct the second component to implement a supported condition corresponding to the ranked order.

31. A system comprising:

a memory;

a processor coupled to the memory;

means for ascertaining an action to be performed on data obtained from a data source and retrieving content policies associated with the action, wherein ascertaining is from a sink trust authority associated with a data sink;

means for retrieving content policies associated with the action, wherein retrieving content policies is from a source trust authority and at least one other component;

means for ranking the policies in a ranked order and inquiring whether individual policies are supported by the data sink, wherein means for ranking comprises means for creating an array which ranks the policies from highest priority to lowest priority; and, means for directing the data sink to implement one of the ranked policies supported by the data sink along a trust media path, wherein the trusted media path comprises the sink trust authority, the source trust authority, and the at least one other component, wherein the at least one other component is a policy component negotiating one or more policies between the source trust authority and the sink trust authority.

32. The system of claim 31, wherein all of the means comprise computer-executable instructions embodied on a computer-readable storage medium.

33. The system of claim 31, wherein all of the means are embodied in a policy engine embodied on a computer-readable storage medium.

* * * * *